United States Patent
Tan et al.

(10) Patent No.: US 11,231,514 B2
(45) Date of Patent: Jan. 25, 2022

(54) METHOD FOR ATTENUATION COMPENSATION UTILIZING NON-STATIONARY MATCHING FILTERS

(71) Applicant: ExxonMobil Upstream Research Company, Spring, TX (US)

(72) Inventors: Sirui Tan, Spring, TX (US); Junzhe Sun, San Jose, CA (US)

(73) Assignee: ExxonMobil Upstream Research Company, Spring, TX (US)

(*) Notice: Subject to any disclaimer, the term of this patent is extended or adjusted under 35 U.S.C. 154(b) by 0 days.

(21) Appl. No.: 17/247,527

(22) Filed: Dec. 15, 2020

(65) Prior Publication Data

US 2021/0302608 A1 Sep. 30, 2021

Related U.S. Application Data (60) Provisional application No. 62/994,485, filed on Mar. 25, 2020.

(51) Int. Cl.
*G01V 1/28* (2006.01)
*G01V 1/34* (2006.01)

(52) U.S. Cl.
CPC ............... *G01V 1/282* (2013.01); *G01V 1/34* (2013.01)

(58) Field of Classification Search
CPC .................................. G01V 1/282; G01V 1/34
See application file for complete search history.

(56) References Cited

FOREIGN PATENT DOCUMENTS

CN 104570125 B * 9/2016

OTHER PUBLICATIONS

Casasanta, L. et al. (2017) "Applications of Single-iteration Kirchhoff Least-squares Migration", SEG Technical Program Expanded Abstracts, Society of Exploration Geophysicists, pp. 4432-4437.
Cavalca, M. et al. (2015) "Q-compensation through Depth Domain Inversion", 77th EAGE Conference and Exhibition, European Association of Geoscientists & Engineers, Jun. 2015, vol. 2015, No. 1, pp. 1-5.

(Continued)

*Primary Examiner* — Daniel Pihulic
(74) *Attorney, Agent, or Firm* — ExxonMobil Upstream Research Company—Law Department (57) ABSTRACT

A method and apparatus for generating attenuation-compensated images of subsurface region, including: computing an image of the region utilizing elastic wave propagation, based on field data and subsurface model; generating forward-modeled data utilizing forward viscoelastic wave propagation, based on the image; computing secondary image by migration; computing NMF based on the images; and applying the NMF to the image to generate the attenuation-compensated image. A method and apparatus includes: iteratively computing attenuation-compensated gradient of the region utilizing an elastic wave propagation operator in the back-propagation and a viscoelastic wave propagation operator in the forward modelling, based on field data and subsurface model; computing search direction based on the attenuation-compensated gradient, searching for an improved model, and checking the improved model for convergence.

20 Claims, 6 Drawing Sheets

(56) References Cited

OTHER PUBLICATIONS

Chen, Y. et al. (2017) "Q-least-squares Reverse Time Migration with Viscoacoustic Deblurring Filters", Geophysics, vol. 82, No. 6, pp. S425-S438.
Chen, Y. et al. (2019) "Migration of Viscoacoustic Data using Acoustic Reverse Time Migration with Hybrid Deblurring Filters", Geophysics, vol. 84. No. 3, pp. S127-S136.
Guitton, A. (2004) "Amplitude and Kinematic Corrections of Migrated Images for Nonunitary Imaging Operators", Geophysics, vol. 69, No. 4, pp. 1017-1024.
Shao, G. et al. (2017) "Least-squares Q Migration: The Path to Improved Seismic Resolution and Amplitude Fidelity", SEG Technical Program Expanded Abstracts, Society of Exploration Geophysicists, pp. 4400-4404.
Sun, J. et al. (2015) "Viscoacoustic Modeling and Imaging using Low-rank Approximation", Geophysics, vol. 80, No. 5, pp. A103-A108.
Tromp, J. et al. (2005) "Seismic Tomography, Adjoint Methods, Time Reversal and Banana-doughnut Kernels", Geophysical Journal International, vol. 160, No. 1, pp. 195-216.

\* cited by examiner

METHOD FOR ATTENUATION COMPENSATION UTILIZING NON-STATIONARY MATCHING FILTERS

CROSS REFERENCE TO RELATED APPLICATION

This application claims the benefit of priority from U.S. Provisional Application No. 62/994,485, filed Mar. 25, 2020, the disclosure of which is incorporated herein by reference in its entirety.

FIELD

This disclosure relates generally to the field of geophysical prospecting and, more particularly, to prospecting for hydrocarbon and related data processing. Specifically, exemplary embodiments relate to methods and apparatus for improving computational efficiency and/or quality of the result by utilizing non-stationary matching filters to compensate, or at least adjust, for attenuation in Reverse Time Migration and/or Full Waveform Inversion procedures.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of geophysical prospecting is to accurately detect, locate, identify, model, and/or quantify subsurface structures and likelihood of hydrocarbon occurrence. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is delivered/propagated into the earth. Seismic waves are reflected from subsurface structures and are received by a number of seismic sensors or "receivers" (e.g., geophones). The seismic data received by the seismic sensors is processed in an effort to create an accurate mapping (e.g., an image and/or images of maps, such as 2-D or 3-D images presented on a display) of the subsurface region. The processed data is then examined (e.g., analysis of images from the mapping) with a goal of identifying geological structures that may contain hydrocarbons.

A goal of seismic data processing is to generate a high-resolution image of the reflectivity of the Earth's subsurface structure. Often, inversion techniques (such as Full Waveform Inversion (FWI)) may be used to generate such reflectivity images. Inversion generally involves geophysical methods to estimate subsurface properties (such as velocity or density). Typically, inversion begins by using a starting subsurface physical properties model to generate synthetic seismic data (e.g., by solving a wave equation using a numerical scheme). The synthetic seismic data are compared with the field seismic data. Based on the comparison, differences, or data residuals, are identified between the synthetic seismic data and the field seismic data. Based on the data residuals, the value of an objective function is calculated. A modified subsurface model is then generated to reduce or minimize the objective function. The modified subsurface model is then used to simulate a new set of synthetic seismic data. This new set of synthetic seismic data is compared with the field data to recalculate the value of the objective function. An objective function optimization procedure is iterated by using the new updated model as the starting model for finding another search direction, which will then be used to perturb the model in order to better explain the observed data. The process continues until an updated model is found that satisfactorily explains the observed data. A global or local optimization method can be used to minimize the objective function and/or to update the subsurface model.

In complex geological formations, data migration is recognized to be an important technique for imaging seismic data. For example, Reverse Time Migration (RTM) may back-propagate a wavefield at the seismic receivers using a two-way wave equation, and then cross-correlate with energy forward-propagated from the source. RTM can produce good images at all reflector dips, but may be more expensive than other migration techniques (e.g., Kirchhoff migration).

It has been a long-standing challenge to compensate for attenuation effects in FWI and/or RTM. The adjoint wavefields, or back-propagated wavefield, of viscoelastic wave equations may be damped, instead of compensated, during FWI and/or RTM. This attenuation may lead to very weak amplitude in the attenuation zones of the resulting subsurface model and/or image.

Conventionally, there have been two categories of methods to address this attenuation issue. The first category aims to decouple the phase and amplitude effects of attenuation so that the amplitude of the back-propagated wavefield can be compensated. An example of such methods is low-rank modeling and imaging (e.g., Sun et al., 2015). However, wave propagation modeling is significantly more expensive when phase and amplitude are decoupled than coupled. The second category of methods relies on the inverse Hessian (e.g., Chen et al., 2017). Because of attenuation, the condition number of the Hessian matrix may be quite poor, leading to slow convergence.

A more efficient attenuation-compensation method would be beneficial to improve the resolution of migrated images, to balance the amplitudes, to attenuate migration artifacts, and/or to provide an accurate starting model to significantly reduce the number of iterations needed for FWI and/or RTM to achieve convergence.

SUMMARY

In one or more disclosed embodiments, non-stationary matching filters may be used to invert a pseudo-Hessian matrix to compensate for attenuation effects in Full Waveform Inversion (FWI) and/or Reverse Time Migration (RTM). In one or more disclosed embodiments, a non-symmetric pseudo-Hessian matrix may be formed from a viscoelastic wave propagation operator used with forward modeling, and from an elastic wave propagation operator used with the adjoint modeling. In one or more disclosed embodiments, a non-stationary matching filter may be positioned to reflect the geology of the subsurface region. Embodiments of the present disclosure can thereby be useful in the discovery and/or extraction of hydrocarbons from subsurface formations.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects.

The term "seismic data" as used herein broadly means any data received and/or recorded as part of the seismic surveying process, including particle displacement, velocity, and/or acceleration, pressure, reflection, shear, and/or refraction wave data. "Seismic data" is also intended to include any data or properties, including geophysical properties such as one or more of: elastic properties (e.g., P and/or S wave velocity, P-Impedance, S-Impedance, density, attenuation, anisotropy, and the like); seismic stacks (e.g., seismic angle stacks); compressional velocity models; and porosity, permeability, or the like, that the ordinarily skilled artisan at the time of this disclosure will recognize may be inferred or otherwise derived from such data received and/or recorded as part of the seismic surveying process. Thus, the disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly includes seismic data, as well as other data obtained from non-seismic geophysical methods such as electrical resistivity.

As would be understood by one of ordinary skill in the art with the benefit of this disclosure, a variety of inversion techniques may be applicable herein. For example, Full Waveform Inversion (FWI) may produce the elastic parameters of the surface (for example, p-wave velocity Vp, the ratio of p-wave velocity to s-wave velocity Vp/Vs, and/or p-wave impedance Ip).

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geological model (particularly a model represented in image form) may be represented in volume elements (voxels), in a similar way that a photograph (or 2-D geological model) is represented by picture elements (pixels). Such numerical representations may be shape-based or functional forms in addition to, or in lieu of, cell-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries. For example, a seismic survey may be conducted to acquire the initial data (noting that these and other embodiments may also or instead include obtaining other geophysical data in addition or, or instead of, seismic data—such as obtaining electrical resistivity measurements). In these and other embodiments, models may be utilized to generate synthetic initial data (e.g., computer simulation). In some embodiments, the initial data may be obtained from a library of data from previous seismic surveys or previous computer simulations. In some embodiments, a combination of any two or more of these methods may be utilized to generate the initial data.

A person of ordinary skill in the art with the benefit of this disclosure would understand that seismic attenuation refers to dissipation of energy as seismic waves propagate through subsurface formations. Attenuation is generally measured by a dimensionless quality known as the rock quality factor Q.

Q is as ratio of stored energy to dispersed energy. Q generally decreases in value as the medium becomes more absorptive.

If there is any conflict in the usages of a word or term in this specification and one or more patent or other documents that may be incorporated herein by reference, the definitions that are consistent with this specification should be adopted for the purposes of understanding this disclosure.

Disclosed embodiments compensate, or at least adjust, for attenuation effects in FWI and/or RTM by utilizing non-stationary matching filters (NMFs) to invert a pseudo-Hessian matrix. Conventionally, inverse Hessian problems are solved by utilizing the same viscoelastic wave equation in forward and adjoint forms. In contrast, disclosed embodiments utilize a viscoelastic wave equation in the forward modeling, while utilizing an elastic wave equation in the adjoint modeling, to form a non-symmetric pseudo-Hessian matrix. One of the many potential advantages of the embodiments of the present disclosure is that the pseudo-Hessian matrix has a smaller conditioner number than the conventional Hessian matrix. The smaller conditioner number may thereby provide faster and/or better convergence. Another potential advantage is that embodiments of the present disclosure provide more stable results than conventional direct attenuation-compensation methods utilizing pseudo-spectral and/or low-rank propagators. Additionally, embodiments of the present disclosure provide similar benefits to least-squares techniques, such as deconvolution and illumination compensation independent of attenuation. Another potential advantage is that embodiments of the present disclosure avoid the task of positioning of the Point Spreading Function (PSF) over methods that solve the pseudo-Hessian equation with PSF (e.g., Cavlaca et al., 2015; Chen et al., 2019). It should be understood that spatial positioning of the PSF may be challenging for strong attenuation due to problems with loose resolution for sparse datasets or overlap for coarse datasets. In contrast, embodiments of the present disclosure may position the NMF along the geology. Embodiments of the present disclosure can thereby be useful in the discovery and/or extraction of hydrocarbons from subsurface formations.

Figure 1:
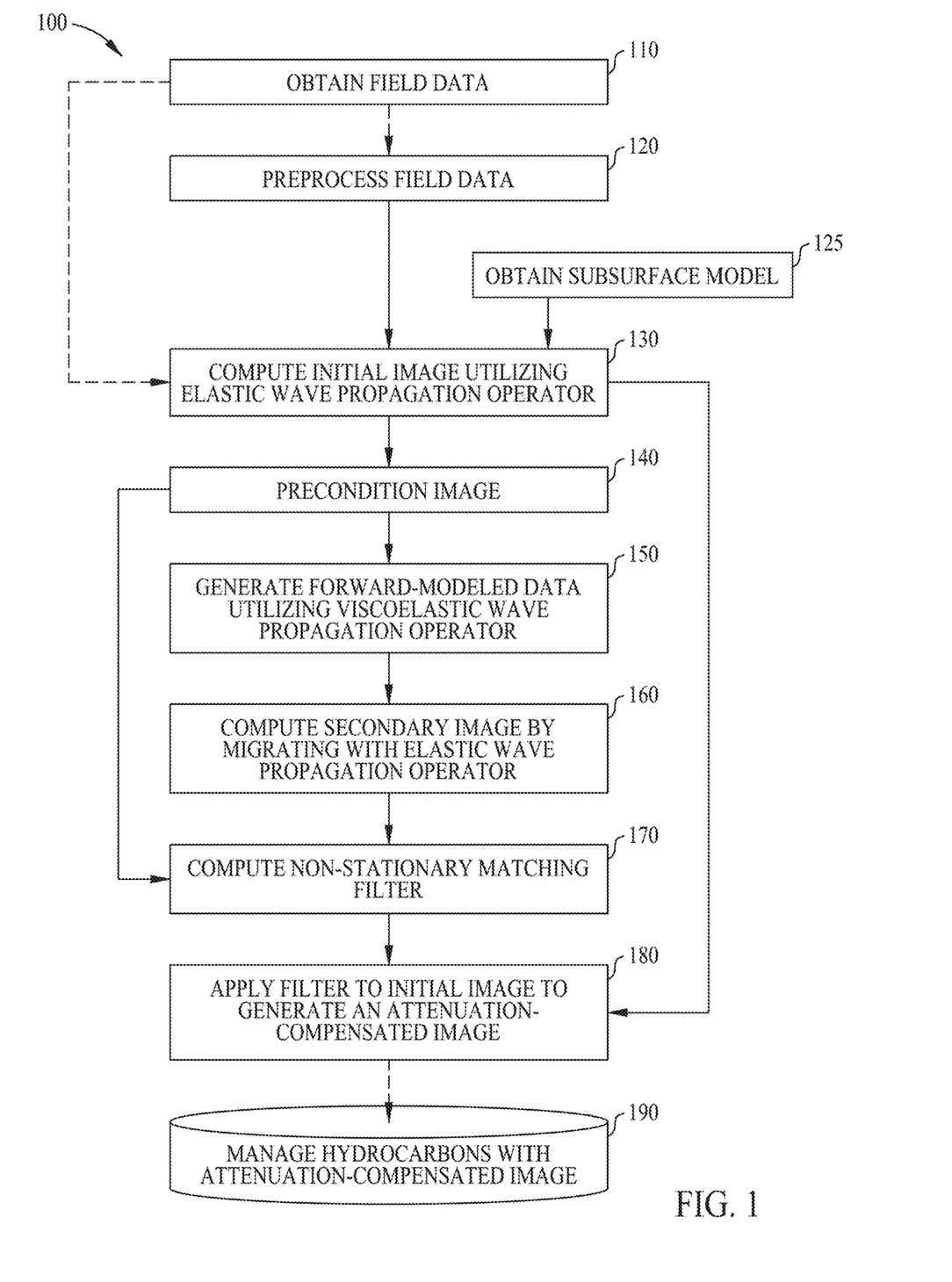
FIG. 1 illustrates an exemplary method for improving computational efficiency and/or quality of the result by utilizing non-stationary matching filters to compensate for attenuation.

FIG. 1 illustrates an exemplary method 100 for improving computational efficiency and/or quality of the result by utilizing NMFs to compensate for attenuation. Method 100 begins at block 110 with obtaining field data. In some embodiments, a seismic survey may be conducted to acquire the field data (noting that these and other embodiments may also or instead include obtaining other geophysical data in addition or, or instead of, seismic data—such as obtaining electrical resistivity measurements). In these and other embodiments, simulation models may be utilized to generate synthetic field data (e.g., computer simulation). In some embodiments, the field data may be obtained from a library of data from previous seismic surveys or previous computer simulations. In some embodiments, a combination of any two or more of these methods may be utilized to generate the field data. In some embodiments, a combination of any two or more of these methods may be utilized to generate the field data.

Method 100 continues at block 120 with optional preprocessing of the field data from block 110. For example, preprocessing may include data conditioning, time signal processing, band-pass filtering, and/or de-noising. A person of ordinary skill in the art with the benefit of this disclosure would be able to identify appropriate preprocessing techniques. The result of preprocessing at block 120 is a seismic data set $d_Q$. Note that the field data (from block 110), and therefore the seismic data set (from block 120), include attenuation effects.

Method 100 continues at block 125 with obtaining a subsurface model. The actions of block 125 and those of block 110 together with block 120 may occur in parallel, sequentially, and/or in any order. The subsurface model may include one or more subsurface properties as a function of location in a subsurface region. In some embodiments, one of the subsurface properties may be arbitrary attenuation through a portion or all of the subsurface region. Note that the seismic data set $d_Q$ is related to the image r via the linearized forward viscoelastic wave propagation operator $L_Q$:

$$d_Q = L_Q r. \quad (1)$$

It should be understood that the operator $L_Q$ is an implicit function of the subsurface model.

Method 100 continues at block 130 with computing an initial image $L^T d_Q$ based on the seismic data set $d_Q$ and the subsurface model. Note that conventional gradient-based methods invert for the image r by solving:

$$r = (L_Q^T L_Q)^{-1} L_Q^T d_Q \quad (2)$$

where $L_Q^T$ is the transpose operator of $L_Q$, or the linearized backward viscoelastic wave propagation operator (e.g., Guitton, 2004; Chen et al., 2017; Shao et al., 2017). In contrast, in disclosed embodiments, the initial image $L^T d_Q$ may be computed by solving:

$$r = (L^T L_Q)^{-1} L^T d_Q \quad (3)$$

where L is the linearized forward elastic wave propagation operator without taking attenuation into account. Note that L differs from $L_Q$ due to attenuation effects.

Method 100 continues at block 140 with preconditioning the image. The preconditioning operator P may include, for example, de-noising, band-pass filtering, etc. The preconditioning results in preconditioned image $PL^T d_Q$. Note that, in some embodiments, preconditioning may be minimal and/or nonexistent. In such embodiments, the preconditioning operator becomes the identity operator.

Method 100 continues at block 150 with generating forward-modeled data $L_Q P L^T d_Q$ with the linearized forward viscoelastic wave propagation operator $L_Q$ utilizing the preconditioned image $PL^T d_Q$.

Method 100 continues at block 160 with migrating with the linearized backward elastic wave propagation operator $L^T$ utilizing the forward-modeled data, resulting in a secondary image $L^T L_Q P L^T d_Q$. The migration operator may include, but is not limited to, migration types such as WEM (Wave Equation Migration) and/or Reverse Time Migration (RTM). Regardless of the migration type, the migration operator does not account for attenuation.

Method 100 continues at block 170 with computation of a NMF based on the preconditioned image from block 140 and secondary image from block 160. The NMF generally estimates the band-limited inverse Hessian matrix by matching the secondary image $L^T L_Q P L^T d_Q$ to the preconditioned initial image $PL^T d_Q$ through regularized non-stationary regression.

Note that method 100 differs from the conventional NMF approach by the forward and adjoint operators. The conventional NMF approach typically uses the same wave equation operator for forward and adjoint modeling, while method 100 uses two different wave equation operators: linearized forward viscoelastic wave propagation operator $L_Q$ and linearized forward elastic wave propagation operator L. At least two advantages of combining different types of modeling operators should be apparent. Firstly, the computation cost of L is lower than that of $L_Q$. Secondly, the condition number of the pseudo-Hessian matrix $L^T L_Q$ is smaller than that of $L^T_Q L_Q$, leading to faster and/or better convergence.

Method 100 continues at block 180 with application of the NMF from block 170 to the initial image from block 130 to generate an attenuation-compensated image $(L^T L_Q)^{-1} L^T d_Q$. For example, a graphical display (e.g., a 2-D and/or a 3-D representation) of the attenuation-compensated image may be generated.

In some embodiments, method 100 continues at block 190 where the attenuation-compensated image is utilized to manage hydrocarbons. For example, the attenuation-compensated image may be used for geologic model building, geologic interpretation, seismic imaging, reservoir identification, operational planning, and/or other hydrocarbon management activities.

Figure 2A:
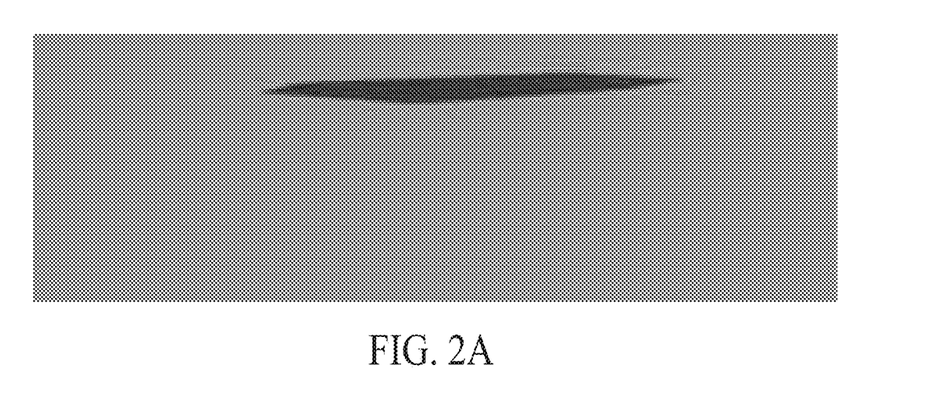
FIGS. 2A-2F illustrate an exemplary application of the method of FIG. 1.
Figure 2B:
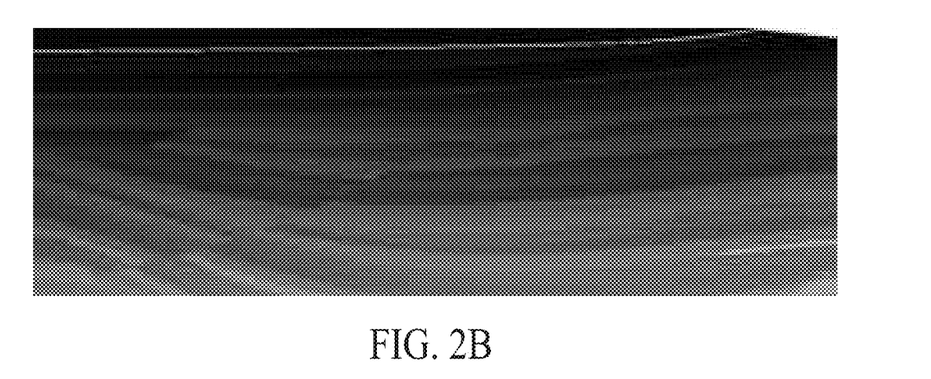
Figure 2C:
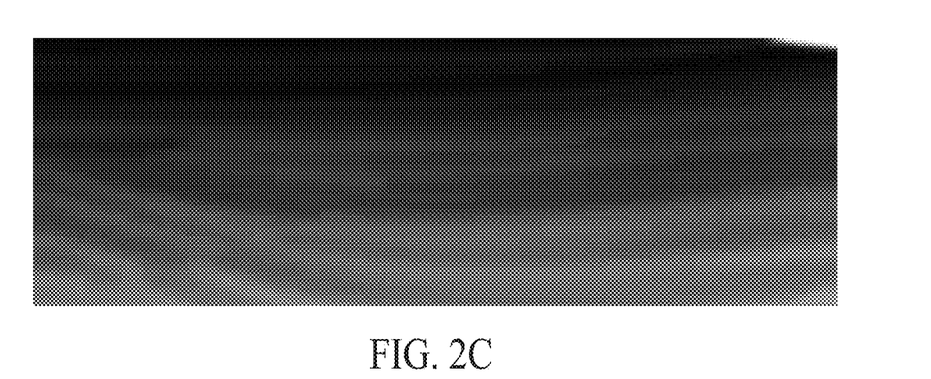
Figure 2D:
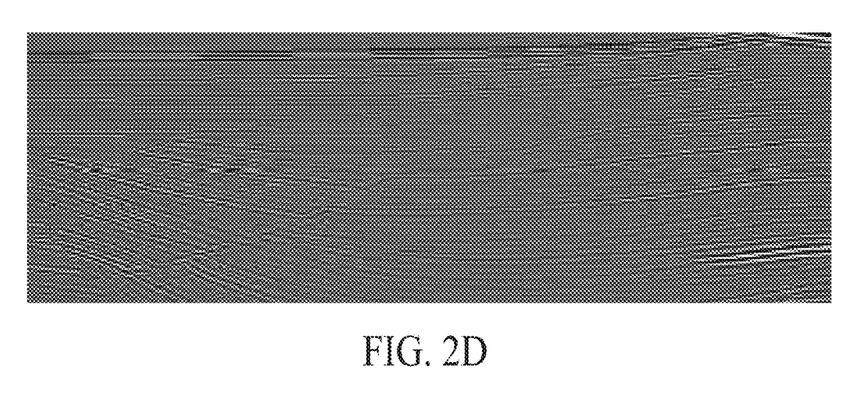
Figure 2E:
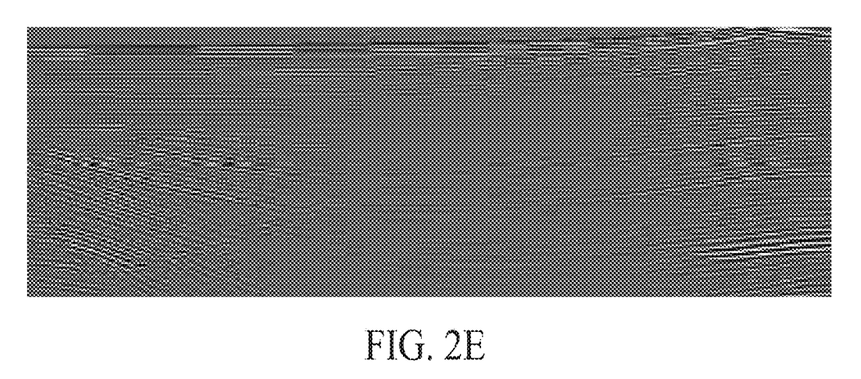
Figure 2F:
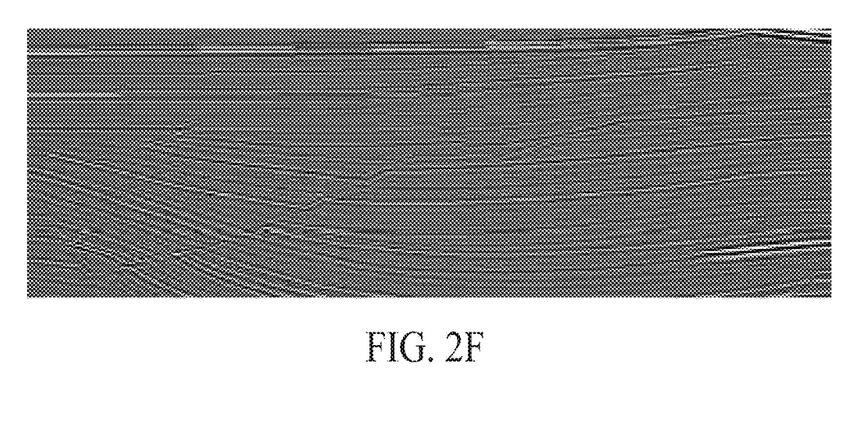

FIGS. 2A-2F illustrate an exemplary application of method 100. FIG. 2A illustrates an attenuation model of a subsurface formation that includes a gas body with strong attenuation. FIG. 2B illustrates a P-wave velocity model of a subsurface formation that includes a number of strata. In this example, method 100 is applied to obtain an attenuation-compensated image of the strata. Method 100 begins (at block 110) with obtaining field data. In this example, the attenuation model of FIG. 2A and a P-wave velocity model of FIG. 2B may be used to simulate data that mimics field data. The initial subsurface models at block 125 are the attenuation model of FIG. 2A and a smoothed P-wave velocity model of FIG. 2C. Method 100 may proceed to generate the initial image of FIG. 2D (at block 130). Note that the portion of the image below the gas body is dimmer compared to the rest of the image because of attenuation effects. Method 100 may continue to generate the secondary image of FIG. 2E (at block 160). Then a NMF is computed at block 170. The NMF is subsequently applied to the initial image to generate an attenuation-compensated image of FIG. 2F. Note the compensated image accurately represents the strata information in the P-wave velocity model of FIG. 2B.

Figure 3:
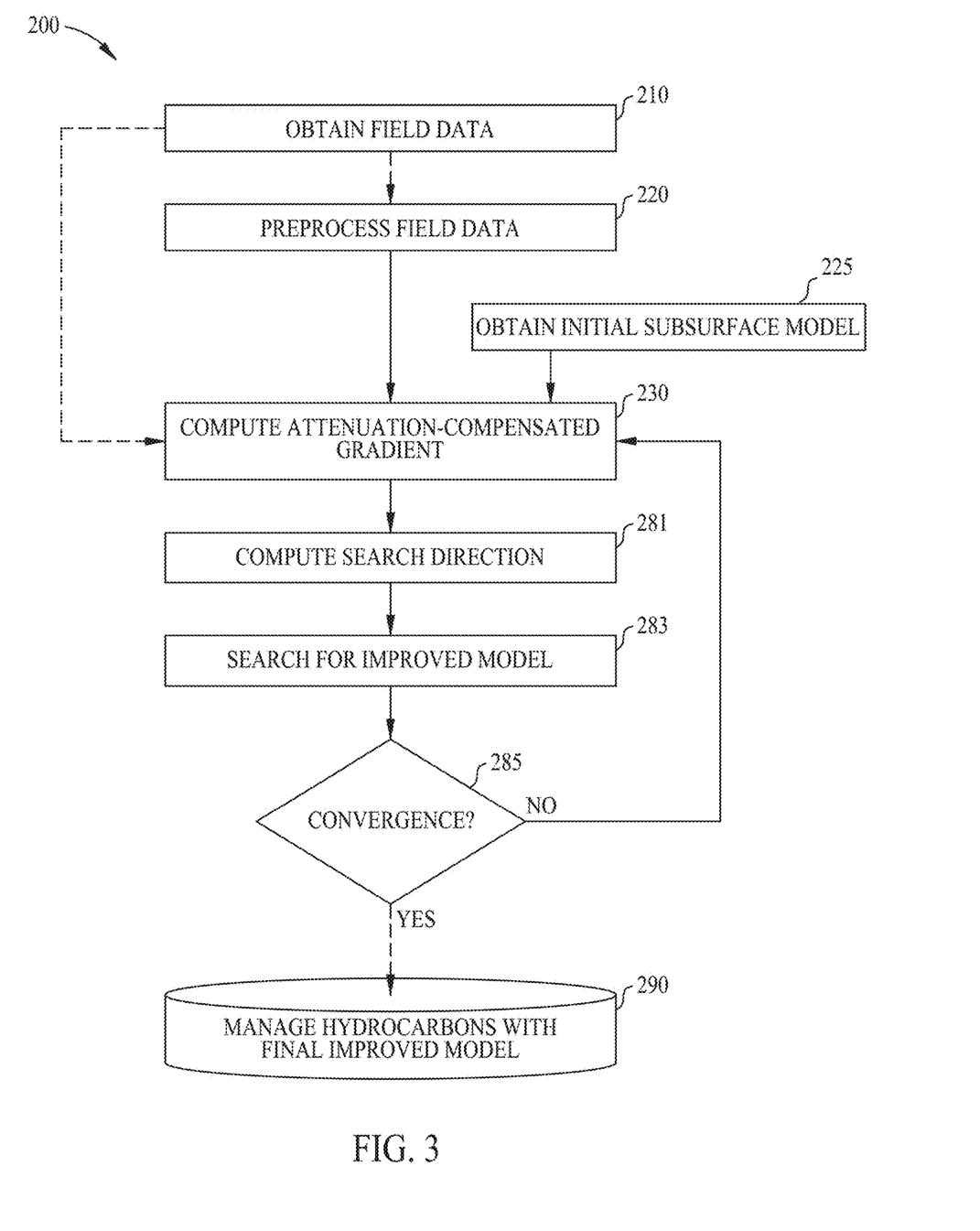
FIG. 3 illustrates another exemplary method for improving computational efficiency and/or quality of the result by utilizing non-stationary matching filters to compensate for attenuation.

FIG. 3 illustrates another exemplary method 200 for improving computational efficiency and/or quality of the result by utilizing NMFs to compensate, at least adjust, for attenuation. While method 100 ultimately generates an attenuation-compensated image, method 200 applies similar techniques to FWI to generate an attenuation-compensated model.

Similar to method 100, method 200 begins at block 210 with obtaining field data.

Similar to method 100, method 200 continues at block 220 with optional preprocessing of the field data from block 210. The result of preprocessing at block 220 is a seismic data set $d_Q$.

Method 200 continues at block 225 with obtaining an initial subsurface model $m_0$. The actions of block 225 and those of block 210 together with block 220 may occur in parallel, sequentially, and/or in any order. The initial subsurface model $m_0$ may include one or more subsurface properties as a function of location in a subsurface region. In some embodiments, one of the subsurface properties may be arbitrary attenuation through a portion or all of the subsurface region.

Method 200 continues at block 230 with computing an attenuation-compensated gradient based on the seismic data set $d_Q$ and the initial subsurface model $m_0$. The gradient is used in later steps to solve for the subsurface model m with a local optimization method. Commonly-used local optimization methods include gradient search, conjugate gradients, quasi Newton, Gauss-Newton and Newton's method. These methods typically utilize gradients of the local objective function with respect to the subsurface parameters. The gradients are often implemented using methods in which both forward equations and adjoint equations (e.g., linear differential equations derived from forward equation using integration by parts and/or particular choices for Lagrange multipliers associated with forward wave equation constraints) are solved (e.g., Tromp et al., 2005). For example, viscoelastic wave equations may be used for forward modeling.

The seismic data set $d_Q$ is related to the subsurface model m via the forward viscoelastic wave propagation operator $F_Q$:

$$d_Q = F_Q(m). \quad (4)$$

Note that, for imaging (as with method 100), the seismic data set is related to the image via a linear function $L_Q$. Alternatively, in FWI (as with method 200), the seismic data set is related to the model via a nonlinear function $F_Q$. In conventional FWI, the gradient G is computed by solving:

$$G = L_Q^T d_{res}, \quad (5)$$

where $d_{res}$ is the data residual and $L_Q^T$ is the transpose operator of $L_Q$, or the linearized backward wave propagation operator. $L_Q$ is the linearized version of $F_Q$. The data residual $d_{res}$ may be computed utilizing $F_Q(m_0)$, which is the forward-modeled data from the initial model $m_0$, and the seismic data set $d_Q$. One example of data residual is:

$$d_{res} = F_Q(m_0) - d_Q. \quad (6)$$

In contrast, in disclosed embodiments, the gradient G may be computed by solving:

$$G = L^T d_{res}, \quad (7)$$

where L is the linearized forward elastic wave propagation operator without taking attenuation into account, and $L^T$ is the transpose operator of L, or the linearized backward wave propagation operator without attenuation. Note that L differs from $L_Q$ due to attenuation effects.

Figure 4:
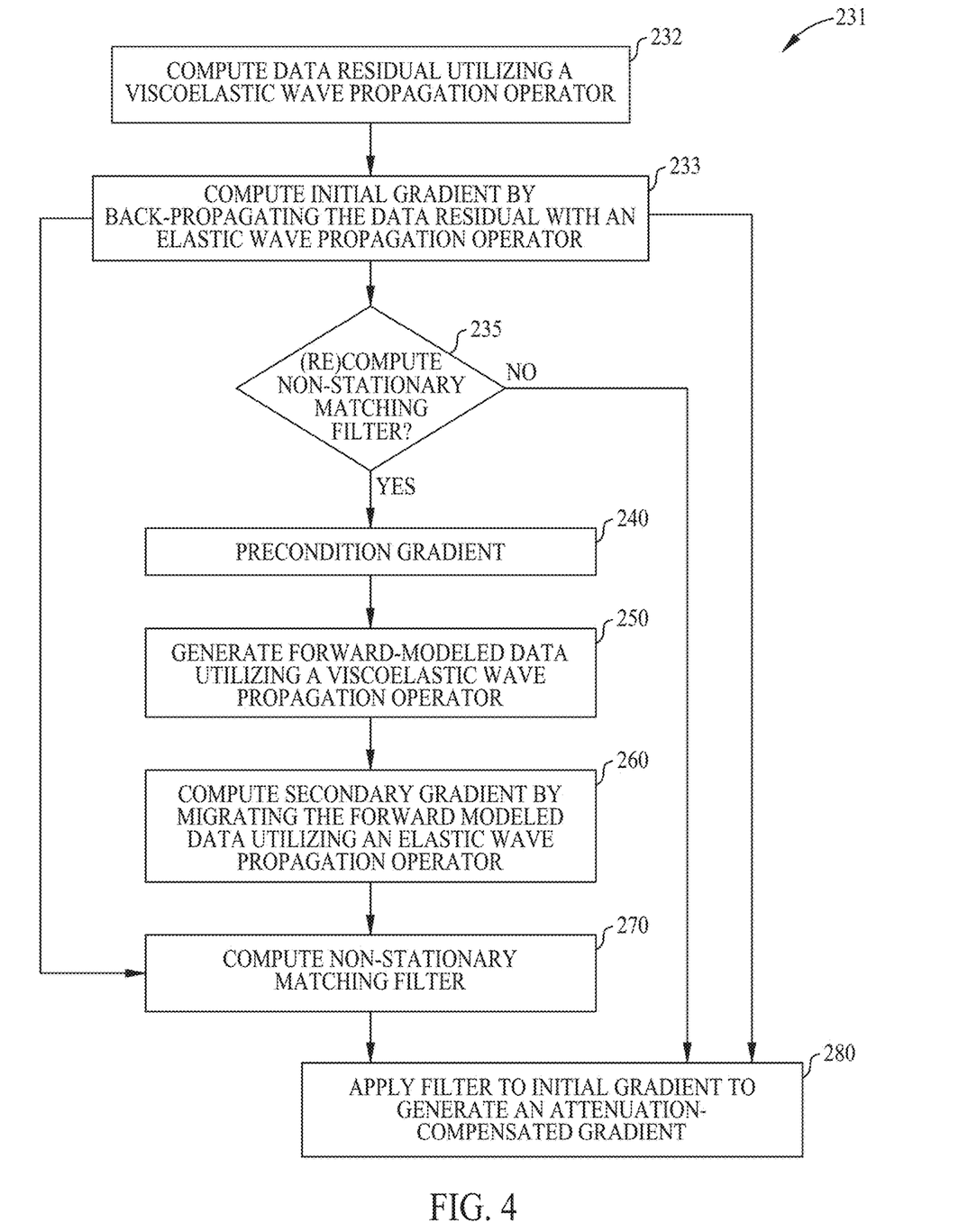
FIG. 4 illustrates an exemplary subroutine for the method of FIG. 3.

FIG. 4 illustrates an exemplary subroutine 231 for computing an attenuation-compensated gradient based on the seismic data set $d_Q$ and the subsurface model m. Subroutine 231 may be utilized in method 200 at block 230. As illustrated, subroutine 231 begins at block 232 with computing the data residual utilizing a viscoelastic wave propagation operator. The actions of block 232 resemble the conventional gradient calculation of Eq (5).

Subroutine 231 continues at block 233 with computing the initial gradient G by back-propagating the data residual with an elastic wave propagation operator, as in Eq (7). As explained above, the actions of block 233 are different from the conventional method because the backward wave propagation operator does not have attenuation.

Subroutine 231 of method 200 continues at decision block 235, where a determination is made whether to compute or re-compute the NMF. In the very first iteration, the NMF will always be computed. In subsequent iterations, if the current subsurface model has significant changes compared to the previous subsurface model from which the NMF is computed, then the NMF is re-computed with the current subsurface model (along the "yes" track of subroutine 231). Otherwise, the NMF computed from previous subsurface model is utilized at block 280 (along the "no" track of subroutine 231).

If it is determined at block 235 to (re)compute NMF, similar to method 100, subroutine 231 of method 200 continues at block 240 with preconditioning the gradient. The preconditioning results in preconditioned gradient PG. Note that, in some embodiments, preconditioning may be minimal and/or nonexistent. In such embodiments, the preconditioning operator becomes the identity operator.

Similar to method 100, subroutine 231 of method 200 continues at block 250 with generating forward-modeled data $L_Q$PG with the linearized forward viscoelastic wave propagation operator $L_Q$ utilizing the preconditioned gradient PG.

Similar to method 100, subroutine 231 of method 200 continues at block 260 with migrating with $L^T$ utilizing the forward modeled data $L_Q$PG, resulting in a secondary gradient $L^T L_Q$ PG.

Similar to method 100, subroutine 231 of method 200 continues at block 270 with computation of a NMF based on the preconditioned gradient from block 240 and secondary gradient from block 260. The NMF generally estimates the band-limited inverse Hessian matrix by matching the secondary gradient $L^T L_Q$ PG to the preconditioned initial gradient PG through regularized non-stationary regression.

Similar to method 100, subroutine 231 of method 200 continues at block 280 with application of the NMF from either block 235 or block 270 to the initial gradient from block 233 to generate an attenuation-compensated gradient $(L^T L_Q)^{-1}$G. Note that subroutine 231 of method 200 may also reach block 280 when it is determined at block 235 to not (re)compute the NMF. In such instances, the NMF from the immediately-prior iteration of block 270 may be utilized at block 280. An attenuation-compensated model is determined from the attenuation-compensated gradient.

Unlike method 100, method 200 continues with FWI techniques of computing a search direction at block 281 (of FIG. 3), searching for an improved model at block 283, and determining at block 285 whether the improved model has reached convergence. If it is determined that convergence has not been reached, method 200 returns to block 230 where a new attenuation-compensated gradient is computed based upon the improved model from block 283.

In some embodiments, following convergence at block 285, method 200 continues at block 290 where the final improved model is utilized to manage hydrocarbons. For example, a graphical display (e.g., a 2-D and/or a 3-D representation) of the final improved model may be generated. In some embodiments, the final improved model may be used for geologic model building, geologic interpretation, seismic imaging, reservoir identification, operational planning, and/or other hydrocarbon management activities.

In practical applications, the present technological advancement may be used in conjunction with a seismic data analysis system (e.g., a high-speed computer) programmed in accordance with the disclosures herein. Preferably, in order to efficiently perform inversion according to various embodiments herein, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 5:
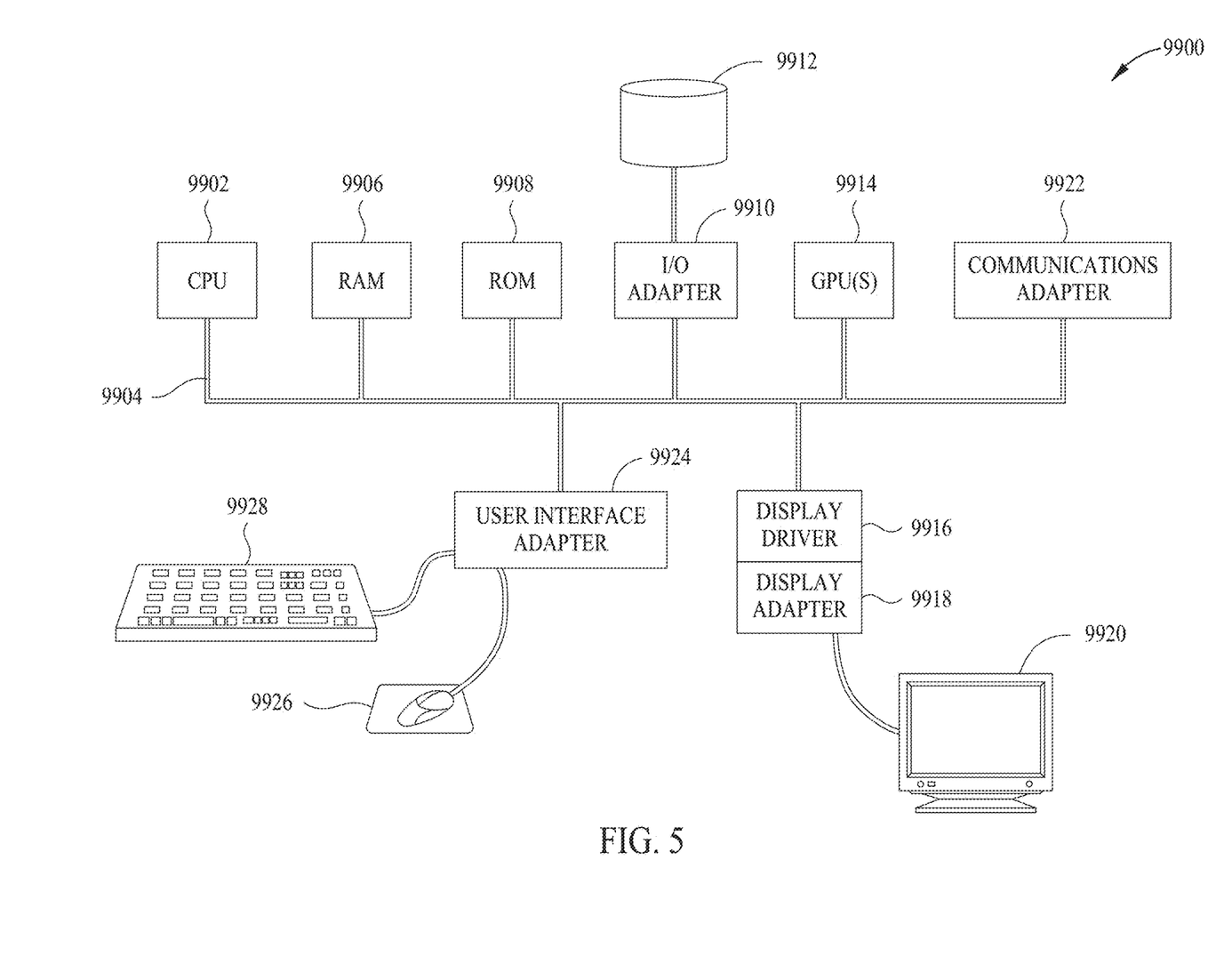
FIG. 5 illustrates a block diagram of a seismic data analysis system upon which the present technological advancement may be embodied.

FIG. 5 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 5, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein (e.g., images, gradients, models, data, etc.). As the models themselves are representations of geophysical data, such a display device may also be said more generically to be configured to display graphical representations of a geophysical data set, which geophysical data set may include the models and data representations described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

The above-described techniques, and/or systems implementing such techniques, can further include hydrocarbon management based at least in part upon the above techniques. For instance, methods according to various embodiments may include managing hydrocarbons based at least in part upon high-resolution images constructed according to the above-described methods. In particular, such methods may include drilling a well, and/or causing a well to be drilled, based at least in part upon the high-resolution image (e.g., such that the well is located based at least in part upon a location determined from the high-resolution image, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

REFERENCES

Casasanta, L., Perrone, F., Roberts, G., Ratcliffe, A., Purcell, K., Jafargandomi, A. and Poole, G., 2017. Applications of single-iteration Kirchhoff least-squares migration. In SEG Technical Program Expanded Abstracts 2017 (pp. 4432-4437). Society of Exploration Geophysicists.

Cavalca, M., Fletcher, R. P. and Du, X., 2015, June. Q-compensation through depth domain inversion. In 77th EAGE Conference and Exhibition 2015 (Vol. 2015, No. 1, pp. 1-5). European Association of Geoscientists & Engineers.

Chen, Y., Dutta, G., Dai, W. and Schuster, G. T., 2017. Q-least-squares reverse time migration with viscoacoustic deblurring filters. Geophysics, 82(6), pp. S425-S438.

Chen, Y., Guo, B. and Schuster, G. T., 2019. Migration of viscoacoustic data using acoustic reverse time migration with hybrid deblurring filters. Geophysics, 84(3), pp. S127-S136.

Guitton, A., 2004. Amplitude and kinematic corrections of migrated images for nonunitary imaging operators. Geophysics, 69(4), pp. 1017-1024.

Shao, G., Zhuang, D., Huang, R., Wang, P., Nolte, B., Paramo, P. and Vincent, K., 2017. Least-squares Q migration: The path to improved seismic resolution and amplitude fidelity. In SEG Technical Program Expanded Abstracts 2017 (pp. 4400-4404). Society of Exploration Geophysicists.

Sun, J., Zhu, T. and Fomel, S., 2015. Viscoacoustic modeling and imaging using low-rank approximation. Geophysics, 80(5), pp. A103-A108.

Tromp, J., Tape, C. and Liu, Q., 2005. Seismic tomography, adjoint methods, time reversal and banana-doughnut kernels. Geophysical Journal International, 160(1), pp. 195-216.

The invention claimed is:

1. A method of generating an attenuation-compensated image of a subsurface region, comprising:
    computing an initial image of the subsurface region utilizing an elastic wave propagation operator and based on field data and a subsurface model;
    generating forward-modeled data utilizing a forward viscoelastic wave propagation operator and based on the initial image;
    computing a secondary image by migrating the forward-modeled data with the elastic wave propagation operator;
    computing a non-stationary matching filter based on the initial image and the secondary image; and
    applying the non-stationary matching filter to the initial image to generate the attenuation-compensated image.

2. The method of claim 1, wherein the forward viscoelastic wave propagation operator is linearized.

3. The method of claim 1, further comprising obtaining the field data and preprocessing the field data to generate a seismic data set prior to computing the initial image, wherein computing the initial image is based on the seismic data set.

4. The method of claim 1, further comprising preconditioning the initial image to generate a preconditioned image prior to generating the forward-modeled data, wherein:
    generating the forward-modeled data is based on the preconditioned image, and
    computing the non-stationary matching filter is based on the preconditioned image.

5. The method of claim 1, wherein the migrating comprises at least one of: Wave Equation Migration and Reverse Time Migration.

6. The method of claim 1, further comprising generating a graphical display of the attenuation-compensated image.

7. The method of claim 6, further comprising managing hydrocarbons based on the graphical display.

8. A method of generating an attenuation-compensated model of a subsurface region, comprising:
    (a) computing an attenuation-compensated gradient of the subsurface region based on field data and a subsurface model;
    (b) computing a search direction based on the attenuation-compensated gradient;
    (c) searching for an improved model;
    (d) checking the improved model for convergence; and
    (e) in the absence of convergence:
        updating the subsurface model with the improved model; and
        repeating (a)-(e).

9. The method of claim 8, wherein the computing the attenuation-compensated gradient comprises:
    computing a data residual utilizing a viscoelastic wave propagation operator;
    computing an initial gradient of the subsurface region by back-propagating the data residual with an elastic wave propagation operator;
    determining whether to compute a non-stationary matching filter, and if so:
        generating forward-modeled data utilizing a forward viscoelastic wave propagation operator and based on the initial gradient;

computing a secondary gradient by migrating the forward-modeled data with the elastic wave propagation operator; and computing the non-stationary matching filter based on the initial gradient and the secondary gradient; and applying the non-stationary matching filter to the initial gradient to generate an attenuation-compensated gradient.

10. The method of claim 9, wherein the determining whether to compute the non-stationary matching filter comprises:

for a first iteration, computing the non-stationary matching filter;

for an iteration other than the first iteration, if the subsurface model has significant changes compared to a previous improved model for which the non-stationary matching filter was last computed, computing the non-stationary matching filter; and otherwise, not computing the non-stationary matching filter.

11. The method of claim 9, further comprising, for at least one iteration of (a)-(e), preconditioning the initial gradient to generate a preconditioned gradient prior to generating the forward-modeled data, wherein:

generating the forward-modeled data is based on the preconditioned gradient, and computing the non-stationary matching filter is based on the preconditioned gradient.

12. The method of claim 9, wherein, for at least one iteration of (a)-(e), the migrating comprises at least one of: Wave Equation Migration and Reverse Time Migration.

13. The method of claim 8, further comprising obtaining the field data and preprocessing the field data to generate a seismic data set prior to computing the attenuation-compensated gradient, wherein computing the attenuation-compensated gradient is based on the seismic data set.

14. The method of claim 8, further comprising generating a graphical display of the attenuation-compensated model.

15. The method of claim 14, further comprising managing hydrocarbons based on the graphical display.

16. An improved method for generating an image of a subsurface region, the improvement of which comprises: utilizing a viscoelastic wave propagation operator with forward modeling, while utilizing an elastic wave propagation operator with adjoint modeling, the method comprising:

computing an initial image of the subsurface region utilizing the elastic wave propagation operator and based on field data and a subsurface model;

generating forward-modeled data utilizing the viscoelastic wave propagation operator and based on the initial image;

computing a secondary image by migrating the forward-modeled data with the elastic wave propagation operator;

computing a non-stationary matching filter based on the initial image and the secondary image; and applying the non-stationary matching filter to the initial image to generate the attenuation-compensated image.

17. The improved method of claim 16, further comprising obtaining the field data and preprocessing the field data to generate a seismic data set prior to computing the initial image, wherein computing the initial image is based on the seismic data set.

18. The improved method of claim 16, further comprising preconditioning the initial image to generate a preconditioned image prior to generating the forward-modeled data, wherein:

generating the forward-modeled data is based on the preconditioned image, and computing the non-stationary matching filter is based on the preconditioned image.

19. The improved method of claim 16, wherein the migrating comprises at least one of: Wave Equation Migration and Reverse Time Migration.

20. The improved method of claim 16, further comprising generating a graphical display of the attenuation-compensated image.

* * * * *